April 10, 1928. 1,665,532
A. R. COOK
ROTARY TYPE OF PLOW
Filed Nov. 12, 1926 3 Sheets-Sheet 1
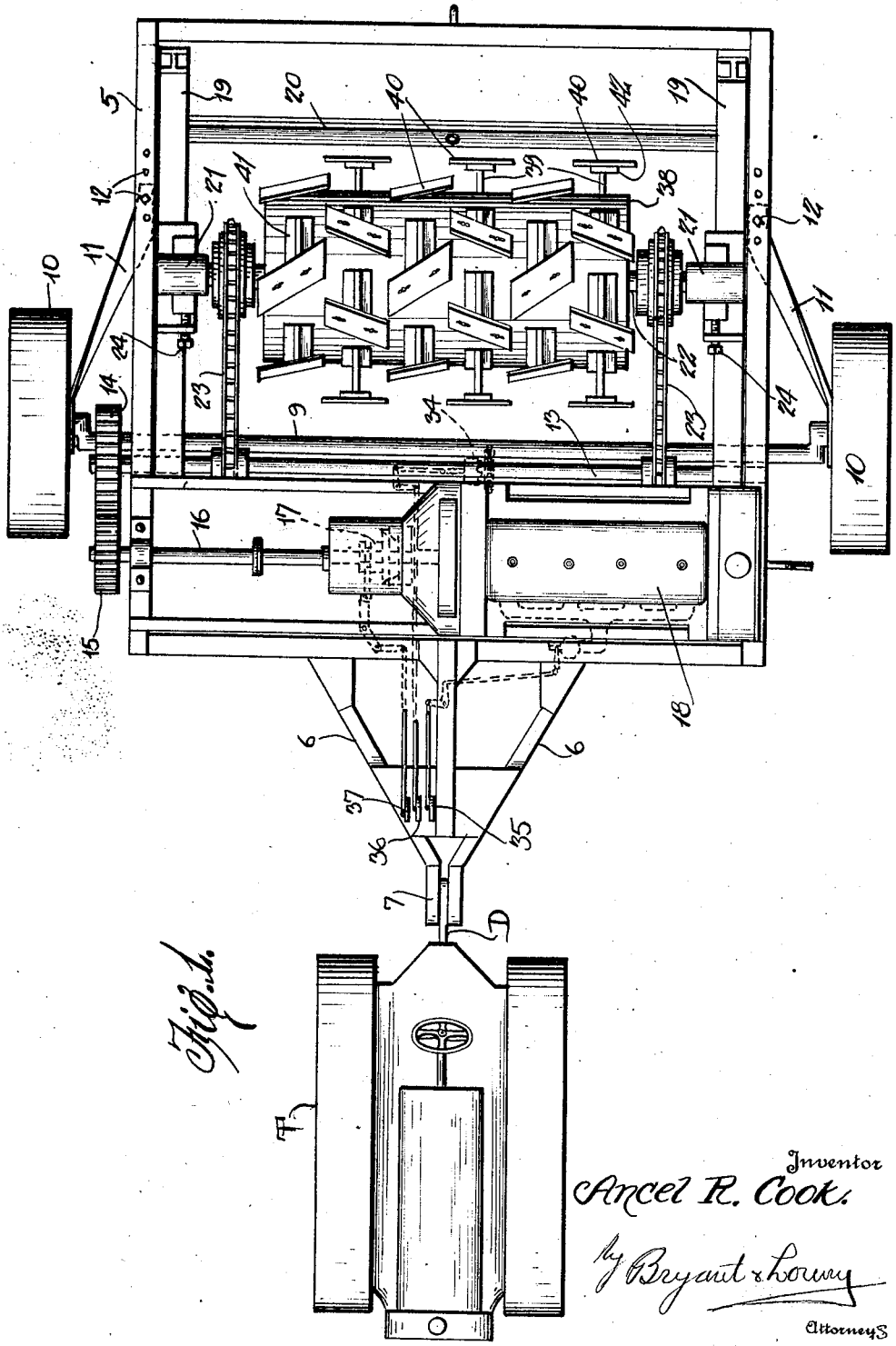
Inventor
Ancel R. Cook.
by Bryant & Lowry
Attorneys April 10, 1928.
A. R. COOK
1,665,532
ROTARY TYPE OF PLOW
Filed Nov. 12, 1926
3 Sheets-Sheet 2
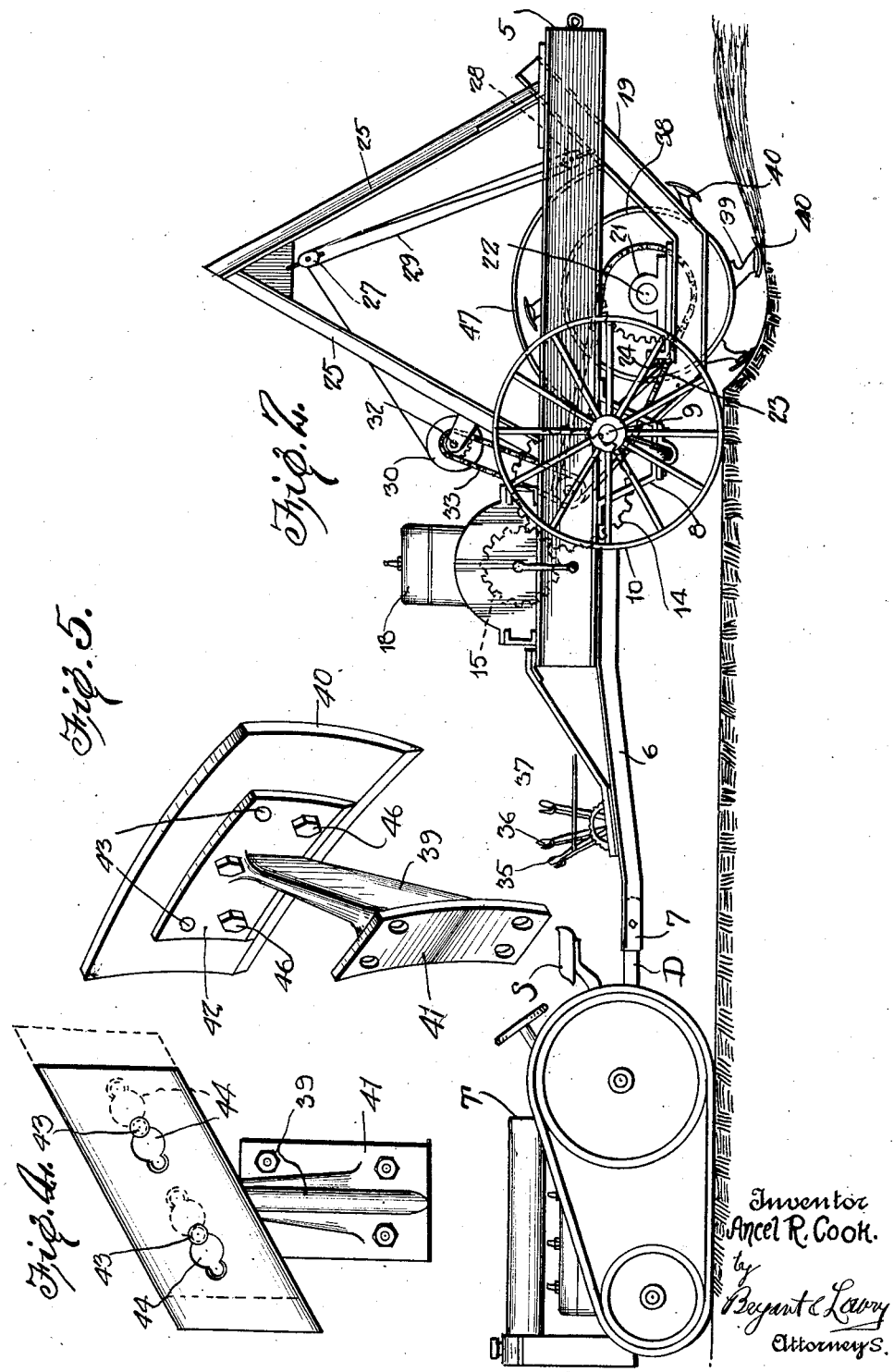

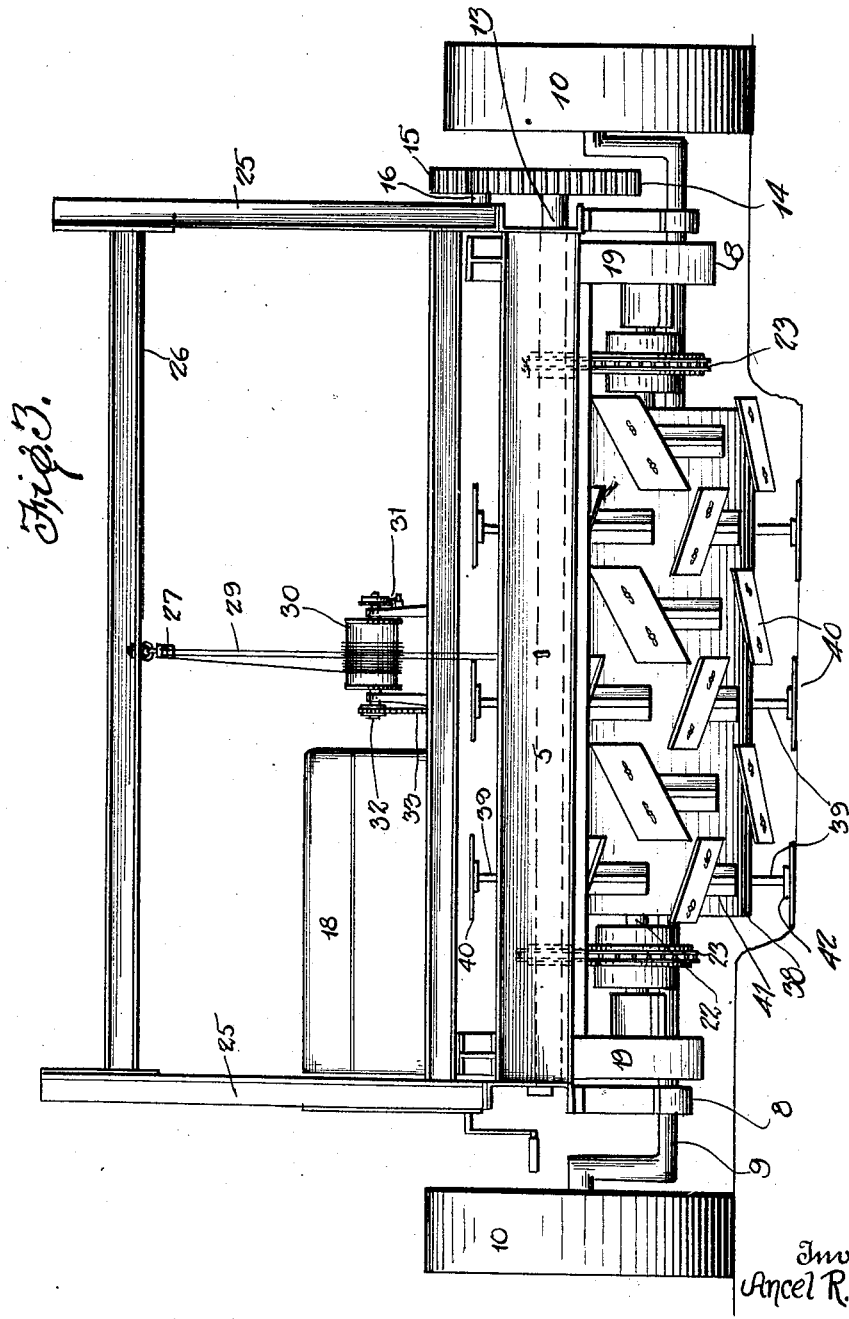

Patented Apr. 10, 1928.

1,665,532

UNITED STATES PATENT OFFICE.

ANCEL R. COOK, OF SACRAMENTO, CALIFORNIA.

ROTARY TYPE OF PLOW.

Application filed November 12, 1926. Serial No. 148,014.

This invention relates to plows, and has more particular reference to an improved plow of that type embodying a rotary driven plowing implement.

The primary object of the present invention is to provide an improved form of plow embodying a trailer adapted to be drawn along behind a tractor or the like and including a rotary plowing implement adapted to be driven by a motor mounted upon the trailer frame.

A general object of the invention is to provide a rotary plow of the above kind which is extremely simple and durable in construction as well as efficient in operation.

A more specific object is to provide an improved trailer plow of the above kind which may be conveniently controlled from the driver's seat of the tractor utilized to draw the plow over the field, so that driving of the plowing implement, its speed of operation, and its depth of operation beneath the surface of the soil may be readily controlled at will.

A still further object is to provide a rotary plowing implement of simple and improved form capable of plowing the soil at a uniform depth and involving plow shovels or blades formed and arranged so as to pass through the ground or soil with a minimum resistance.

A still further object is to provide an improved form of plow blade or shovel capable of being reversed in use, as well as being capable of ready reversal, attachment or removal.

Further objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a top plan view, partly broken away, and with the plowing implement hoist removed for sake of clearness, of a plow constructed in accordance with the present invention and operatively hitched to a tractor;

Figure 2 is a side elevational view, partly broken away, of the plow and tractor shown in Figure 1;

Figure 3 is an enlarged rear elevational view of the plow looking toward the left of Figure 2;

Figure 4 is a plan view of one of the plow shovels or blades of the plowing implement and its associated supporting standard or arm; and Figure 5 is a perspective view of the device shown in Figure 4.

Referring more in detail to the drawings, the present plow consists of a suitable rigid and preferably rectangular main frame 5 having means for hitching the forward end thereof to the rearwardly extending draw bar D of a conventional form of tractor generally indicated at T, such hitching means preferably embodying forwardly converging frame bars 6 rigidly attached to the main frame 5 and having slightly spaced parallel forward end portions 7 to receive the draw bar D therebetween for being fastened in any suitable manner. Rigid with and depending from the side rails of the main frame 5 are transversely aligned brackets 8 in which is journaled the straight intermediate portion of a crank axle 9 having ground engaging or supporting wheels 10 journaled upon the crank ends thereof outwardly of the sides of the main frame 5 as clearly shown in Figures 1 and 3. It will be apparent that the crank ends of the axle 9 normally project upward, and as shown more clearly in Figure 1 they are adjustably connected to the side rails of the main frame 5 by means of braces 11 having their forward ends pivotally engaged with the journal portions of the axle 9 which carry the wheels, and having their rear ends adjustably associated as generally shown at 12 with said side rails of the frame 5. Thus, the point of attachment of the rear ends of braces 11 with the frame 5 may be shifted forwardly or rearwardly so as to cause rotary adjustment of axle 9 in the bearing brackets 8 and thereby cause shifting of the supporting wheels 10 forwardly or rearwardly so that the weight upon the main frame 5 may be balanced more or less, forwardly and rearwardly of the transversely aligned axes of said supporting wheels. It is evident that this balancing of the trailer or plow is desirable so that no undue downward pressure of upward lift will be had upon the draw bar D of the tractor.

A rotary counter-shaft 13 is journaled transversely of the main frame 5 with its ends supported by the side rails of the latter, and the end of this shaft 13 projects at one side of the main frame 5 where it is provided with a spur gear 14 meshing at its forward side with a further spur gear 15 fixed upon the adjacent end of a transversely extending horizontal drive shaft 16 whose inner end is releasably connected by means of a clutch as at 17 with the adjacent end of the power shaft of a suitable motor such as an internal combustion engine 18 rigidly mounted upon the forward end portion of main frame 5 as shown clearly in Figure 1.

The plow further embodies a vertically swinging sub-frame for carrying the rotary plowing implement, and this frame consists of a pair of side rails 19 disposed directly at the inner sides of the side rails of main frame 5 and having their rear end portions rigidly connected by a transverse brace-bar 20, the forward ends of the rails 19 being pivotally engaged with the shaft 13 for vertical swinging movement. As shown, the rails 19 are of general U-shape with horizontal intermediate portions and upwardly diverging end portions or legs, the rear ones of which engage the inner sides of the side rails of main frame 5 so as to insure effective guiding of the sub-frame in its vertical movement as well as relieving of the same from or bracing thereof against lateral strains. Slidably mounted upon the horizontal intermediate portions of the rails 19 for movement longitudinally of the trailer are bearings 21 in which are journaled the ends of a transverse horizontal shaft 22 which carries the rotary plowing implement and which is operatively connected with the counter-shaft 13 at opposite sides or ends of the plowing implement, by means of sprocket gearing generally indicated at 23. Means is provided as indicated at 24 for shifting the bearings 21 rearwardly so as to keep the driving chains of the sprocket gearing 23 taut at all times. It is apparent that upon engaging the clutch 17 the counter-shaft 13 will be driven by the motor 18, and rotation will be imparted to the implement shaft 22 in a counter-clockwise direction through the sprocket gearing 23. Obviously, the plowing implement may be thrown out of operation by disengaging clutch 17 so that rotation is no longer imparted to the shaft 16 by the motor.

The sub-frame which carries the plowing implement is mounted for vertical swinging movement so that the plowing implement may be adjusted vertically relative to the main frame for varying the depth at which the plowing implement operates beneath the surface of the soil, and for vertically adjusting the sub-frame and the plowing implement carried thereby a drum and cable hoist is preferably employed. As shown, this hoist preferably consists of a frame having side members rigidly mounted upon the side rails of the main frame 5 and composed of upwardly converging posts 25 which are rigidly connected at their upper ends, said side members of the hoist frame being rigidly connected at their apices by means of a transverse horizontal or overhead beam 26. A multiple pulley block 27 is suspended from the intermediate portion of the beam 26, and a similar block 28 is attached to the rear connecting bar 20 for the side rails 19 of the sub-frame, a cable 29 being threaded back and forth about the pulleys of the blocks 27 and 28 and having one end portion extending from a pulley of the upper block 27 to a winding drum 30, where it is attached. The other end of the cable 29 is attached to the lower block 28, and it is thus apparent that when the cable 29 is wound upon the drum 30 the strands of the cable between the blocks are shortened and the rear end of the sub-frame is lifted for correspondingly adjusting the plowing implement in an upward direction. On the other hand, by unwinding the cable 29 from the drum 30 the sub frame is allowed to swing downwardly for adjusting the plowing implement in a downward direction and increasing the depth of cut. Any suitable means is provided for retaining the drum 30 against rotation so that the sub-frame will remain in adjusted position, a friction brake being suitable for this purpose and being generally shown in Figure 3 at 31 as associated with the drive shaft 32 of the winding drum 30 and the support for the latter. This drive shaft 32 of the winding drum is preferably operatively connected by means of a sprocket gearing 33 with a sprocket wheel journalled upon the counter-shaft 13 and a suitable clutch 34 may be slidably keyed on the shaft 13 for releasably connecting this sprocket wheel to shaft 13 as shown in Figure 1. Thus, when the clutch 34 is engaged, the rotation of counter-shaft 13 will be transmitted to the winding drum 30 for actuating the same to wind the cable 29 thereon while, upon release of clutch 34 the drum 30 will remain idle until the friction brake 31 is released, whereupon the sub-frame will be allowed to lower under its own weight for the desired distance.

A plurality of control levers 35, 36 and 37 are mounted upon the hitch frame embodying the bars 6, so that said levers are positioned adjacent to and rearwardly of the usual rear driver's seat S with which the tractor T is equipped. As shown generally in Figure 1 the lever 35 may be operatively connected to the controller of motor 18 so that its speed of operation may be varied at will. In a like manner, the lever 36 may be operatively connected to the clutch 34 for throwing the winding drum 30 into and out of operation, while the lever 37 may be operatively connected to clutch 17 for connecting or disconnecting the shaft 16 to or from the motor at will. In this way the various mechanisms of the plow may be conveniently controlled by the driver of the tractor so that the number of attendants required for the operation of the plow is reduced to a minimum.

As shown, the plowing implement preferably consists of a cylinder or drum 38 rigidly mounted upon the shaft 22 between the sprocket gearings 23 and provided with a plurality of peripheral outwardly projecting plow blade or shovel supporting standards or arms 39, which are arranged in uniformly spaced relation and in rows aligned circumferentially of the drum 38 but staggered transversely thereof so that the blades or shovels of each circumferential row are positioned in transverse planes between those of the next adjacent row or rows. The standards 39 have plow blades or shovels 40 attached to the outer ends thereof so that the cutting edges of the shovels are disposed obliquely to the axis of the implement, and the cutting edges of the blades 40 in each circumferential row all extend in the same oblique direction, but in an opposite direction from that in which the cutting edges of the blades of the next adjacent row or rows extend. This construction is preferably effected by forming the blades or shovels 40 of substantially rhomboidal-shape as illustrated clearly in Figures 1 and 4 so that the oblique positioning of the cutting edges will be had with the ends or side edges of the blades parallel with the line of travel of the plow. Moreover, the blades 40 are of arcuate or outwardly curved form so as to be concentric with the shaft 22 and, in connection with the shape of the blades, offer a minimum resistance to the passage of the blades through the soil. The standards 39 are preferably provided with base plates 41 adapted to snugly contact the periphery of drum 38 and provided with numerous perforations for being effectively bolted to the latter as illustrated in Figures 4 and 5. Rigid with the outer end of each standard 39 is a transverse mounting plate 42 upon the outer face of which the associated shovel or blade 40 is adapted to be applied, and rigid with and projecting outwardly from this plate 42 adjacent its forward edge are a pair of headed studs 43. The blade 40 is provided at spaced points coincident with the oblique longitudinal axis thereof with double ended key hole slots 44 through the larger intermediate portions of which the heads of the studs 43 may readily pass when the blade is applied to the supporting plate 42. The blade 40 may then be shifted laterally in either direction so that the shanks of the studs 43 will pass into the restricted corresponding ends of the slots 44 with the surrounding portions of the blades engaged by the heads of studs 43 whereby the blade is effectively detachably retained in place. The provision of double ended key hole slots permits shifting of the blades in either direction so that a desirable variable positioning or adjustment of the blades may be had relative to either supporting standards, 39. Moreover, the blade 40 has cutting edges at both sides, or, in other words, both longitudinal edges of the blade are cutting edges, and by reason of the central positioning of the slots 44 the blades may be reversed for employing either cutting edge with the blade in either adjusted position. To positively guard against detachment of the blade accidentally, the plate 42 is provided with a set screw at a point between the studs 43 and adapted to be threaded outwardly into engagement with the adjacent inner side of the blade 40 for forcing it into tight engagement with the heads of studs 43. This will insure against lateral displacement of the blade from fastened to released position, and the set screw is indicated at 45. By loosening the set screw 45, the blade 40 may be allowed slight play relative to the studs 43, and to tilt the blade for varying the pitch thereof, the plate 42 is provided at spaced points near its rear edge with set screws 46. These set screws 46 are adapted to be threaded outwardly into engagement with the inner face of the blade for thereby tilting the same to the desired pitch.

By reason of the above construction a most efficient blade or shovel is had which may be quickly applied, removed or reversed as well as quickly adjusted as to pitch.

In operation, the tractor T is caused to move forwardly so as to draw the plow along therewith, whereupon the engine 18 is placed into operation and the clutch 17 engaged for driving shaft 16. The rotation of shaft 16 is transmitted through the gearing described to the plowing implement for rotating the latter in a counter-clockwise direction so that the blades will successively engage and enter the soil for plowing in an even manner, the rotation of the plowing implement aiding in the forward travel of the apparatus. If it is desired to lower the plowing implement for increasing the depth of cut, the brake 31 may be temporarily released, and if it is desired to raise the plowing implement for decreasing the depth of cut, this may be caused by engaging the clutch 34 so as to utilize the power of motor 18 for driving drum 30 so that the hoisting cable 39 is wound thereon. In operation, the rotation of the plowing implement causes the soil to be thrown upwardly and rearwardly, and in order to prevent the soil from being thrown upwardly and forwardly so that the soil will not be scattered or allowed to pile upon the plow structure, a hood 47 is carried by the sub-frame to overlie the plowing implement.

What I claim as new is:—

1. A plow including a main wheeled frame having means to hitch the forward end thereof to a tractor or the like, a sub-frame pivoted within the main frame for vertical swinging movement, a rotary plowing implement carried by the sub-frame, means to swing and thereby vertically adjust said sub-frame relative to the main frame, a motor mounted on the main frame, and driving connections between the plowing implement and said motor, said sub-frame embodying rigidly connected side rails of substantially U-shape to provide horizontal intermediate portions and upwardly diverging front and rear legs, the rear legs engaging the inner sides of the main frame to guide the sub-frame in its vertical swinging movements.

2. A plow including a main wheeled frame having means to hitch the forward end thereof to a tractor or the like, a sub-frame pivoted within the main frame for vertical swinging movement, a rotary plowing implement carried by the sub-frame, means to swing and thereby vertically adjust said sub-frame relative to the main frame, a motor mounted on the main frame, driving connections between the plowing implement and said motor, said sub-frame embodying rigidly connected side rails of substantially U-shape to provide horizontal intermediate portions and upwardly diverging front and rear legs, the rear legs engaging the inner sides of the main frame to guide the sub-frame in its vertical swinging movements, bearings mounted on the intermediate portions of said side rails, and a transverse shaft journaled in said bearings and carrying the plowing implement.

3. A two-wheeled trailer plow including a main wheeled frame having means to hitch the forward end thereof to a tractor, means to adjust the wheels longitudinally of the main frame for balancing the weight of the trailer forwardly and rearwardly of the axes of the wheels, a sub-frame pivoted within the main frame for vertical swinging movement, means to swing and thereby vertically adjust said sub-frame relative to the main frame, a rotary cylindrical plowing implement journaled horizontally on and transversely of the sub-frame, and driving means for said plowing implement.

4. A two-wheeled trailer plow including a main wheeled frame having means to hitch the forward end thereof to a tractor, means to adjust the wheels longitudinally of the main frame for balancing the weight of the trailer forwardly and rearwardly of the axes of the wheels, a sub-frame pivoted within the main frame for vertical swinging movement, means to swing and thereby vertically adjust said sub-frame relative to the main frame, a rotary cylindrical plowing implement journaled horizontally on and transversely of the sub-frame, and driving means for said plowing implement, a transverse axle journaled on the main-frame and having crank ends upon which the wheels of the main frame are journaled, said wheel adjusting means comprising adjustable connections between the crank ends of the axle and the main frame.

In testimony whereof I affix my signature.

ANCEL R. COOK.